US 8,108,850 B2

(12) United States Patent
Chang et al.

(10) Patent No.: US 8,108,850 B2
(45) Date of Patent: Jan. 31, 2012

(54) POWER-AWARE COMPILING METHOD

(75) Inventors: Rong-Guey Chang, Minsyong Township, Chiayi County (TW); Tzong-Yen Lin, Changhua (TW)

(73) Assignee: National Chung Cheng University, Cha-Yi (TW)

( * ) Notice: Subject to any disclaimer, the term of this patent is extended or adjusted under 35 U.S.C. 154(b) by 1280 days.

(21) Appl. No.: 11/566,697

(22) Filed: Dec. 5, 2006

(65) Prior Publication Data
US 2007/0300214 A1  Dec. 27, 2007

(30) Foreign Application Priority Data

Jun. 23, 2006  (TW) .............................. 95122714 A

(51) Int. Cl.
G06F 9/45 (2006.01)
G06F 1/00 (2006.01)
G06F 1/26 (2006.01)
(52) U.S. Cl. ........ 717/156; 717/140; 717/151; 717/154; 717/155; 713/300; 713/320; 713/323; 713/330
(58) Field of Classification Search .................. None
See application file for complete search history.

(56) References Cited

U.S. PATENT DOCUMENTS

| 7,082,543 B2* | 7/2006 | Lin ............................. 713/320 |
| 7,539,884 B2* | 5/2009 | You et al. ..................... 713/320 |
| 2003/0014742 A1* | 1/2003 | Seth et al. .................... 717/158 |
| 2006/0037006 A1* | 2/2006 | Aakjer .......................... 717/136 |
| 2006/0206857 A1* | 9/2006 | Liu et al. ...................... 717/104 |

OTHER PUBLICATIONS

Aigner et al., "An Overview of the SUIF2 Compiler Infrastructure," Technical Report, Computer Systems Laboratory, Stanford University and Portland Group, Inc., pp. 1-14, 2000.*
You et al., "Compiler Analysis and Supports for Leakage Power Reduction on Microprocessors," Springer-Verlag Berlin Heidelberg, 2005.*
You et al., "Compilers for Leakage Power Reduction," ACM Transactions on Design Automation of Electronic Systems, vol. 11, No. 1, Jan. 2006, pp. 147-164.*
You et al., "A SinkNHoist Framework for Leakage Power Reduction," Sep. 2005, ACM.*
Zhang et al., "Compiler support for reducing leakage energy consumption," IEEE, 2003.*
Li et al., "Mode Selection and Mode-Dependency Modeling for Power-Aware Embedded Systems," IEEE, 2002.*

* cited by examiner

Primary Examiner — Insun Kang
(74) Attorney, Agent, or Firm — Ming Chow; Sinorica, LLC

(57) ABSTRACT

The present invention discloses a power-aware compiling method, wherein the power model of an application program are established via building and analyzing the control flow chart and the data flow chart of the application program; each functional unit of the application program is assigned a power mode; a judgment is undertaken to determine whether the idle functional units are independent; if none dependency exists between those idle function units, the program codes of the same idle function units are merged into a new basic block, and the idle functional units are turned off for saving power; each new basic block is assigned an appropriate power mode; the basic blocks with the same power modes are merged to reduce the transitions between different power modes; thus, the power consumed by changing voltage or frequency can be decreased.

10 Claims, 10 Drawing Sheets

BEGIN
 For each basic block
  Divide it into regions according to the usage of FU For basic blocks, $B_s$ and $B_t$, where $s \neq t$
  For all regions $R_i$ in $B_s$, $R_j$ in $B_t$
   if ($FU(R_i) = FU(R_j)$) and ($D(R_i, R_j) = \varnothing$)
    Merge $R_i$ and $R_j$ into new region For each basic block
  For all regions $R_i$ in $B_s$, $R_j$ in it
   if ($FU(R_i) = FU(R_j)$) and ($D(R_i, R_j) = \varnothing$)
    Merge $R_i$ and $R_j$ into new region, say $R_k$
   if ($T_{per}(R_k) > r$)
    Insert power-aware-instructions to turn off FU in $R_k$ For each region R
  if ($f_{mem}(R) > \alpha$)
   $f(R) = f_{down}$ For basic blocks, $B_s$ and $B_v$
  For all regions $R_i$ in $B_s$, $R_j$ in $B_v$
   if ($f(R_i) = f(R_j)$) and ($D(R_i, R_j) = \varnothing$)
    Merge $R_i$ and $R_j$ For each basic blocks, say B
  if ($N(B) > \beta$)
   $f(B) = f_{down}$

END

Fig.3

```
int main (void)
{
    ...
    for (i=0; i<100; i++)
        a = a + 1;
    tmp1 = a * c;
    for (j=0; j<200; j++)
        b = b + 2;
    tmp2 = b * d;
    ...
}
```

↓

```
int main (void)
{
    ...
    /* Insert code to turn off the
       multiplier */
    for (i=0; i<100; i++)
        a = a + 1;
    for (j=0; j<200; j++)
        b = b + 2;
    /* Insert code to turn on the
       multiplier */
    tmp1 = a * c;
    tmp2 = b * d;
    ...
}
```

Fig.4

POWER-AWARE COMPILING METHOD

BACKGROUND OF THE INVENTION

1. Field of the Invention

The present invention relates to a compiling method, particularly to a power-aware compiling method.

2. Description of the Related Art

Recently, portable products, such as PDA, mobile phones and MP3 players, become more and more popular. In addition to the compactness of appearance, standby time is also a factor influencing consumers' decisions. Thus, battery runtime becomes a critical factor to evaluate a portable product. Increasing battery runtime not only can reduce the size, weight and cost of a portable product but also can raise the price of the portable product. Therefore, how to increase battery runtime has become a hot topic.

Currently, there are essentially three technologies to reduce the power consumption of portable products. The first one is to solve the power-consumption problem from a hardware approach, wherein special hardwares are used to reduce power consumption, such as the DVS (Dynamic Voltage Scaling) technology proposed by Intel Corp., etc., which modifies the voltage and frequency of a processor to efficiently utilize the processor and avoid unnecessary power consumption; however, the performance of the processor will be obviously influenced. The second one is to solve the power-consumption problem from an operating-system approach, wherein the operating system is modified to reduce power consumption, and the sequence of execution threads is rescheduled to prevent the appearance of the peak busy period; however, recalculation and rescheduling caused by adding a new execution thread will degrade the performance of the processor. The third one is to solve the power-consumption problem from a compiler approach, wherein during compilation, power-related information is added into the program codes to instruct the processor to modify the voltage and frequency; thus, the processor can be efficiently used, and unnecessary power consumption can be avoid; however, such a technology requires a hardware compatibility.

From those discussed above, three phenomena can be observed. The first one is: it is hard to achieve a high power efficiency and a high performance at the same time; if the power efficiency is high, the performance will be low; if the performance is high, the power efficiency will be low. The second one is: some solutions can only apply to special platforms. The third one is: some solutions have to dynamically calculate appropriate voltage and frequency, which delays the processor.

Accordingly, the present invention proposes a power-aware compiling method to overcome the abovementioned problems.

SUMMARY OF THE INVENTION

The primary objective of the present invention is to provide a power-aware compiling method, wherein the same function units are merged into an identical basic block if none dependency exists between those function units; thus, the compiler needn't perform decisions repeatedly when those functional units are idle; thereby, time and resource can be saved; further, the transitions between different power modes can be decreased.

Another objective of the present invention is to provide a power-aware compiling method, wherein the idle functional units are turned off to reduce power consumption.

Further objective of the present invention is to provide a power-aware compiling method, which can save 26% power according to the verifications performed by the standard benchmarks, such as SPEC2000, Mediabench and Dspstone, and can overcome the performance degradation caused by the DVS (Dynamic Voltage Scaling) technology.

To achieve the abovementioned objectives, the present invention proposes a power-aware compiling method, wherein the control flow chart and the data flow chart of an application program are firstly established, and the control flow chart is divided into a plurality of basic blocks according to the functional units used by the application program; next, the control flow chart and the data flow chart are analyzed to establish the power model of the application program, and each functional unit is assigned a power mode; next, the program codes of the same idle function units are merged into a new basic block if none dependency exists between those idle functional units, and the idle functional units are turned off, and the new basic block is assigned an appropriate power mode; then, the basic blocks with the same power modes are merged. The functional units and the basic blocks respectively have their own power modes. When the program is executed to the next basic block, the power modes will be shifted. In the present invention, the frequency of power-mode transition can be reduced via merging the basic blocks together.

Below, the embodiments of the present invention are to be described in detail so that the objectives, technical contents, characteristics and accomplishments of the present invention can be easily understood.

BRIEF DESCRIPTION OF THE DRAWINGS

FIG. 3 is a diagram showing that the power-aware compiling method of the present invention is expressed by pseudo codes.

FIG. 4 is a diagram showing one embodiment of the present invention, wherein a portion of the program codes is processed with the power-aware compiling method of the present invention.

DETAILED DESCRIPTION OF THE INVENTION

The present invention is to provide a power-aware compiling method, which achieves the powerawareness of a compiled application program via rescheduling the program codes of the application program and modifying the voltage used therein.

Figure 1:
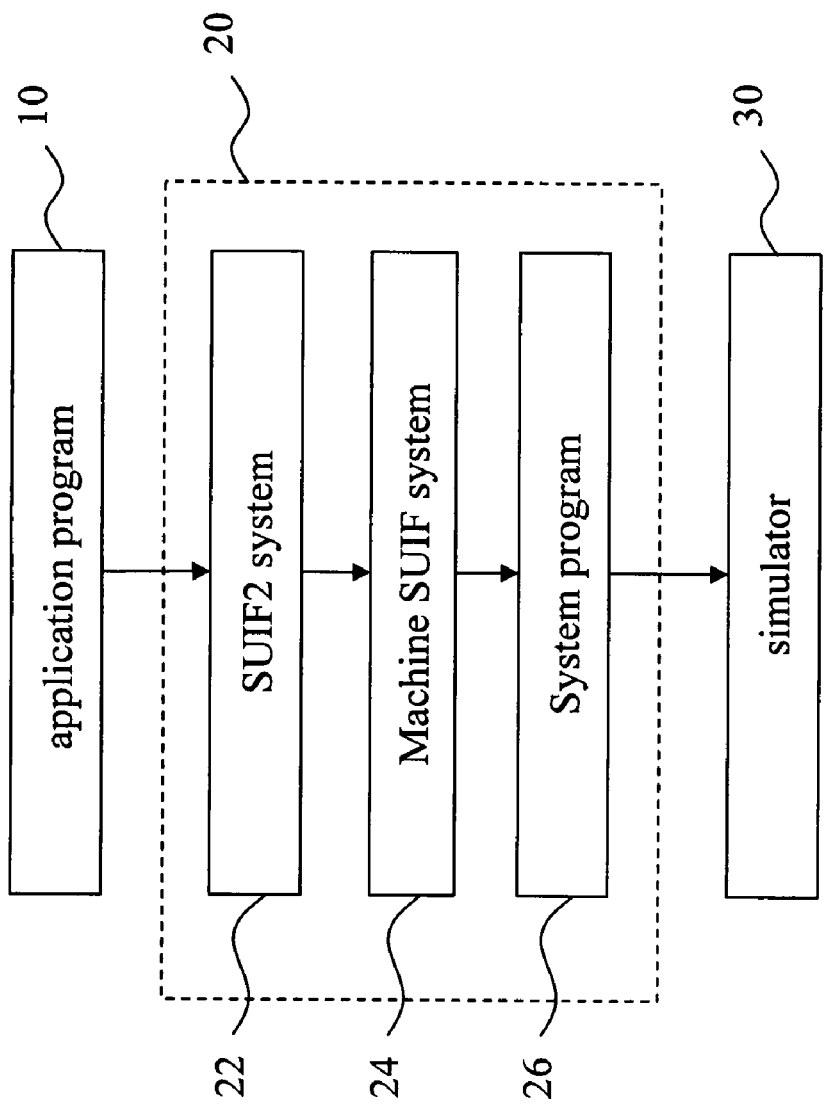
FIG. 1 is a diagram schematically showing the architecture of the compiler system according to the present invention.

Refer to FIG. 1 a diagram showing the architecture of the compiler system according to the present invention. As shown in FIG. 1, the method of the present invention is simulated in a SUIF2 compiler system. Firstly, an application program 10, such the program codes written with C language, is provided. Next, the application program 10 enters into a compiler 20, and then, a low power pass process is undertaken. The first portion of the low power pass process is undertaken in a SUIF2 system 22 and includes: the optimization procedure of the SUIF2 system 22, the high-level SUIF procedure and the low-level SUIF procedure, which are used to undertake the analyses of the internal procedures of the application program 10, such as the global alias analysis, the specialization analysis and the data flow chart analysis.

Figure 2:
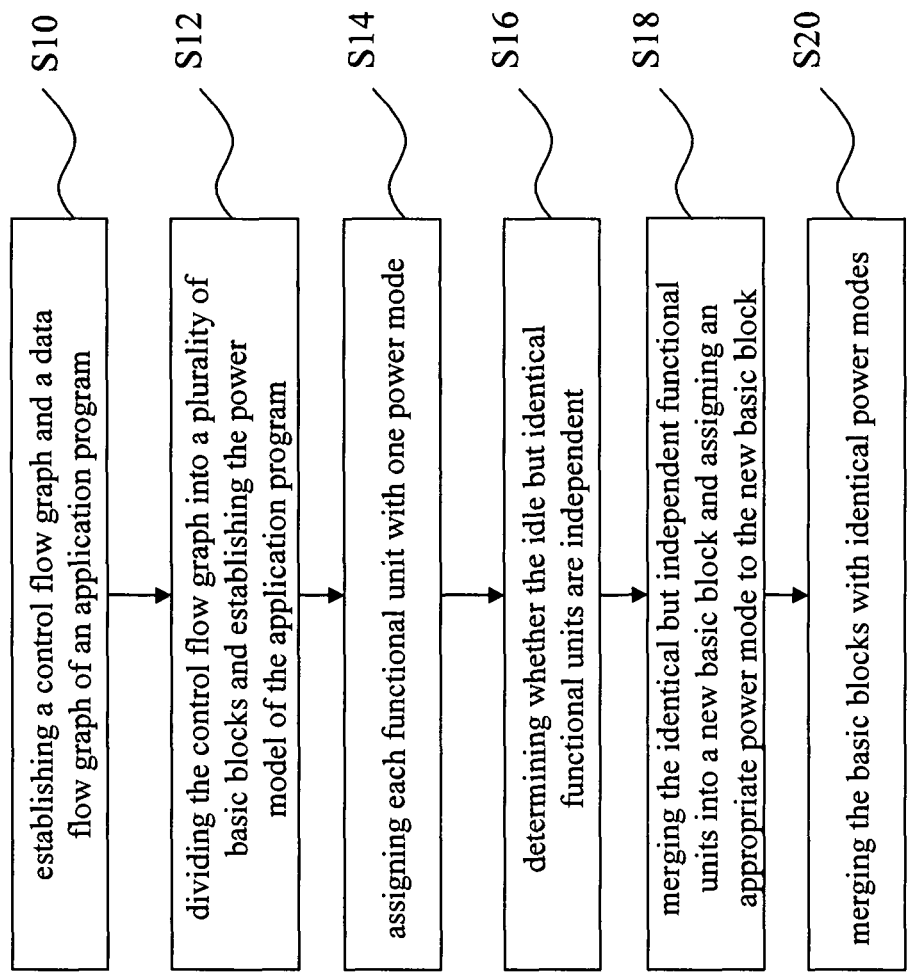
FIG. 2 is a flowchart of the power-aware compiling method according to the present invention.

The second portion of the low power pass process is undertaken in a machine SUIF system 24. Refer to FIG. 2 a flowchart showing the steps of the second portion of the low power pass process. Firstly, the machine SUIF system 24 analyzes a functional-unit database and an optimization interface to establish the control flow graph and the data flow graph of the application program 10 (Step S10). Next, an optimization procedure is undertaken; the control flow graph and the data flow graph are analyzed to establish the power model of the application program 10; the control flow graph is divided into a plurality of basic blocks B (blocks) according to the usage of the functional units, and each basic block is composed of a plurality of regions R, and each region includes at least one functional unit; the functional unit may be an adder or multiplier for integer operation and floating point operation (Step S12). Next, each functional unit is assigned a power mode according to the power model; as the functional units will not be executed synchronically, the idle function units are turned off (Step S14). Next, a judgment is performed to determine whether the same functional units among the idle functional units are dependent (Step S16). Next, two basic blocks with the same idle functional units are merged into a new basic block if none dependency exists between the same idle functional units, and an appropriate power mode is assigned to the new basic block (Step S18). Next, the basic blocks with the same power modes are merged together (Step S20). Then, the steps from Step S16 to Step S20 are repeated until no further merging can be performed.

After the rescheduling process of the application program 10 is completed, the rescheduled and optimized application program is compiled with a system program 26. The system program may be an Alpha simulation program and can perform a cross compilation under the Alpha Linux system. The compiled application program is linked to a run-time library to execute the application program and generate the codes executable in a simulator 30. The simulator 30 may be a Wattch simulator, which can perform a loop-type simulation to determine the power consumption of a CPU under different parameters and the power models under different infrastructures.

Refer to FIG. 3 for the rescheduling method for the program codes, which is written in pseudo codes, wherein N(B) is the execution count of one basic block B; FU(B) is the functional unit executed in one basic block B; FU(R) is the functional unit executed in one region R; $f_{mem}$ is the memory-accessing rate of all the instructions of one basic block B; Tper(R) is the proportion of the execution time of one basic block B; f(B) is the power model of one basic block B; and f(R) is the power model of one region R. The application program is divided into a plurality of regions. If $FU(R_i)=FU(R_j)$ and $D(R_i, R_j)=\emptyset$, regions $R_i$ and $R_j$ are merged into a new region, wherein $FU(R_i)=FU(R_j)$ denotes that the regions $R_i$ and $R_j$ use the same functional units, and $D(R_i, R_j)=\emptyset$ denotes that those two regions are independent. There are three parameters γ, α and β in the pseudo codes, wherein γ is the threshold value to turn on/off one functional unit; α and β are the threshold values to assign a power mode to one region. The value of Tper(R) determines whether to turn off the functional unit in one region R.

In the normal mode of the Watch simulator used in the present invention, the voltage is 1.5V, and the clock frequency is 600 MHz; in the low-voltage mode $f_{down}$, the voltage is 0.3V, and the clock frequency is 300 MHz. In the pseudo codes shown in FIG. 3, two steps thereof involve the decision of the power mode. In the first one, according to α value, each region R is assigned a power mode; then, a judgment is performed to determine whether $f(R_i)=f(R_j)$ and $D(R_i, R_j)=\emptyset$; if the result is yes, regions $R_i$ and $R_j$ are merged into a new region; and the abovementioned steps will be repeated until no further merging can be performed. In the second one, each basic block B is assigned a power mode according to β value.

Below, the embodiment shown in FIG. 4 is to exemplify the power-aware compiling method of the present invention. In this embodiment, there are two "for" loops and two "temp" expressions. As those two loops use the same function units but are independent, and as those two expressions use the same functional units but are independent, those two loops and those two expressions are respectively merged into two regions. Next, the multiplier in the loop region is turned off, and the adder in the expression region is also turned off. Then, the region including two loops is set to operate in the low-voltage mode, and the region including two expressions is set to operate in the normal mode. Via comparing the original program codes with the rescheduled and optimized program codes, it is observed: in the latter one, the adder and the multiplier are respectively merged to two different regions. As the adder will be repeatedly executed many times in the loop, the power mode is set to be the low-voltage mode. In executing the loop, as the multiplier is idle, it is turned off. In executing the expression, as the adder is idle, it is turned off. Therefore, the rescheduled and optimized program codes are more power-efficient than the original program codes.

Figure 5:
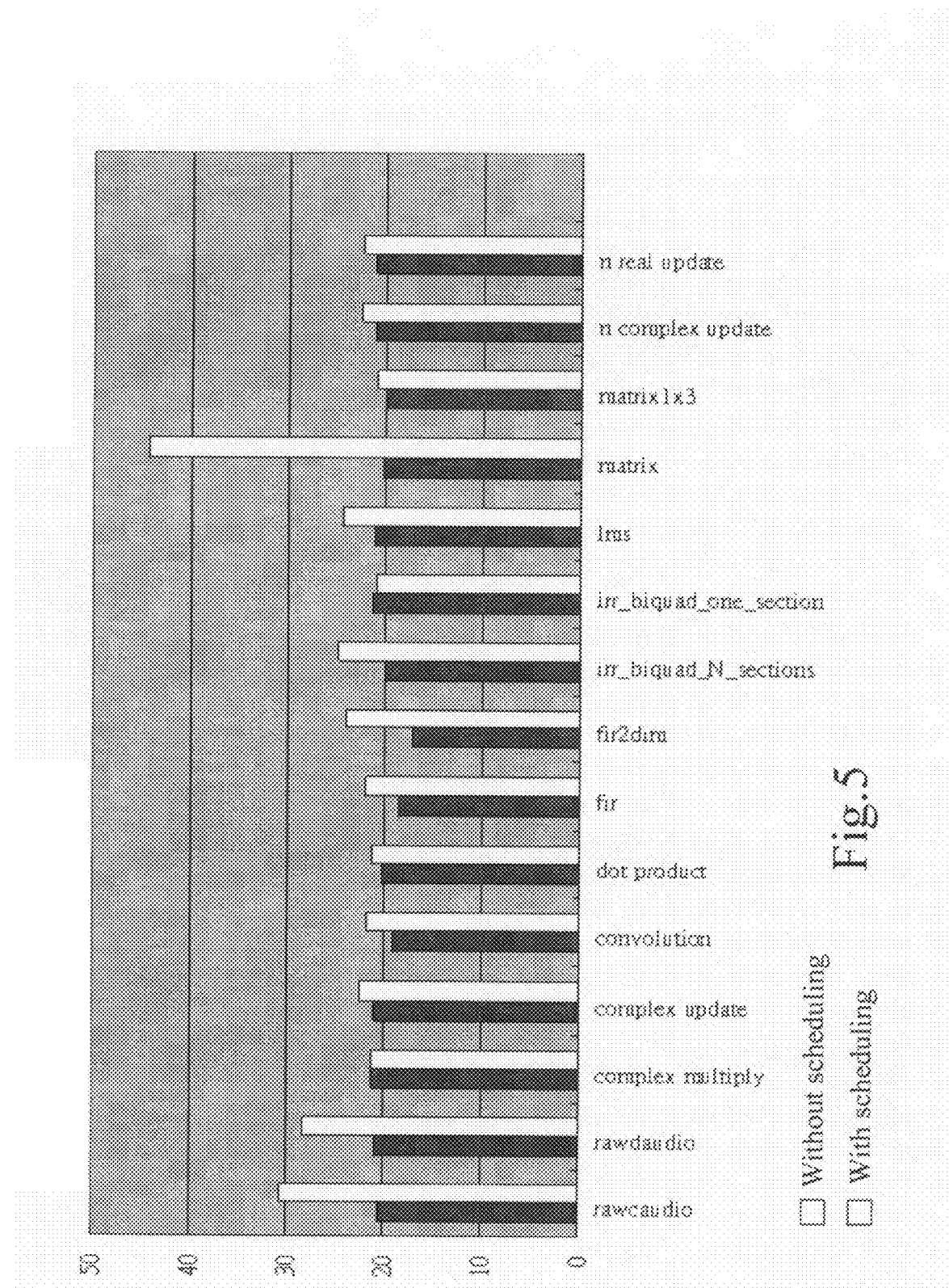
FIG. 5 to FIG. 7 are diagrams showing the power consumptions in executing various instructions when the original program codes and the rescheduled and optimized program codes output by the power-aware compiling method of the present invention are respectively tested with the standard benchmarks, including: the SPEC2000, the Mediabench and the Dspstone.
Figure 6:
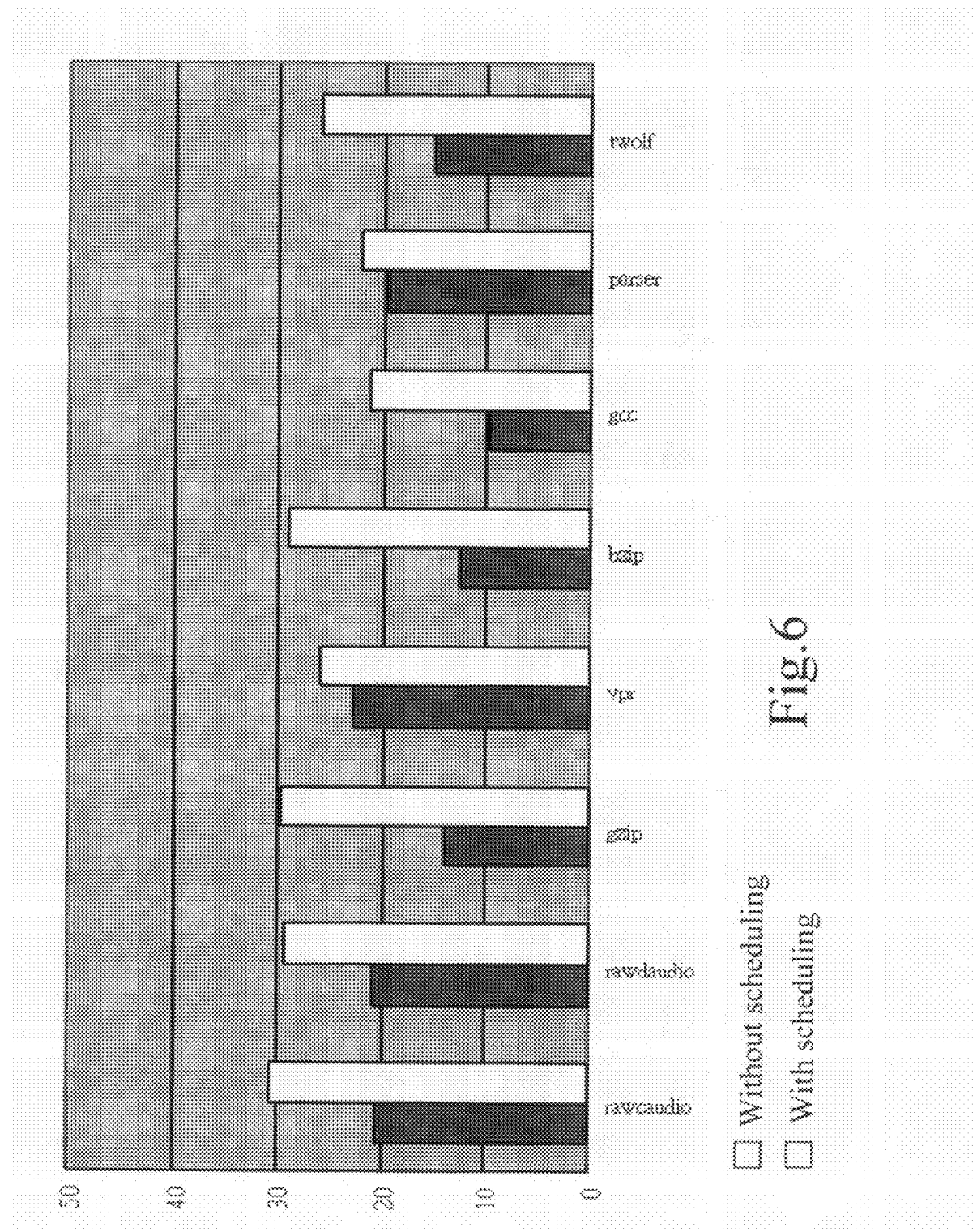
Figure 7:
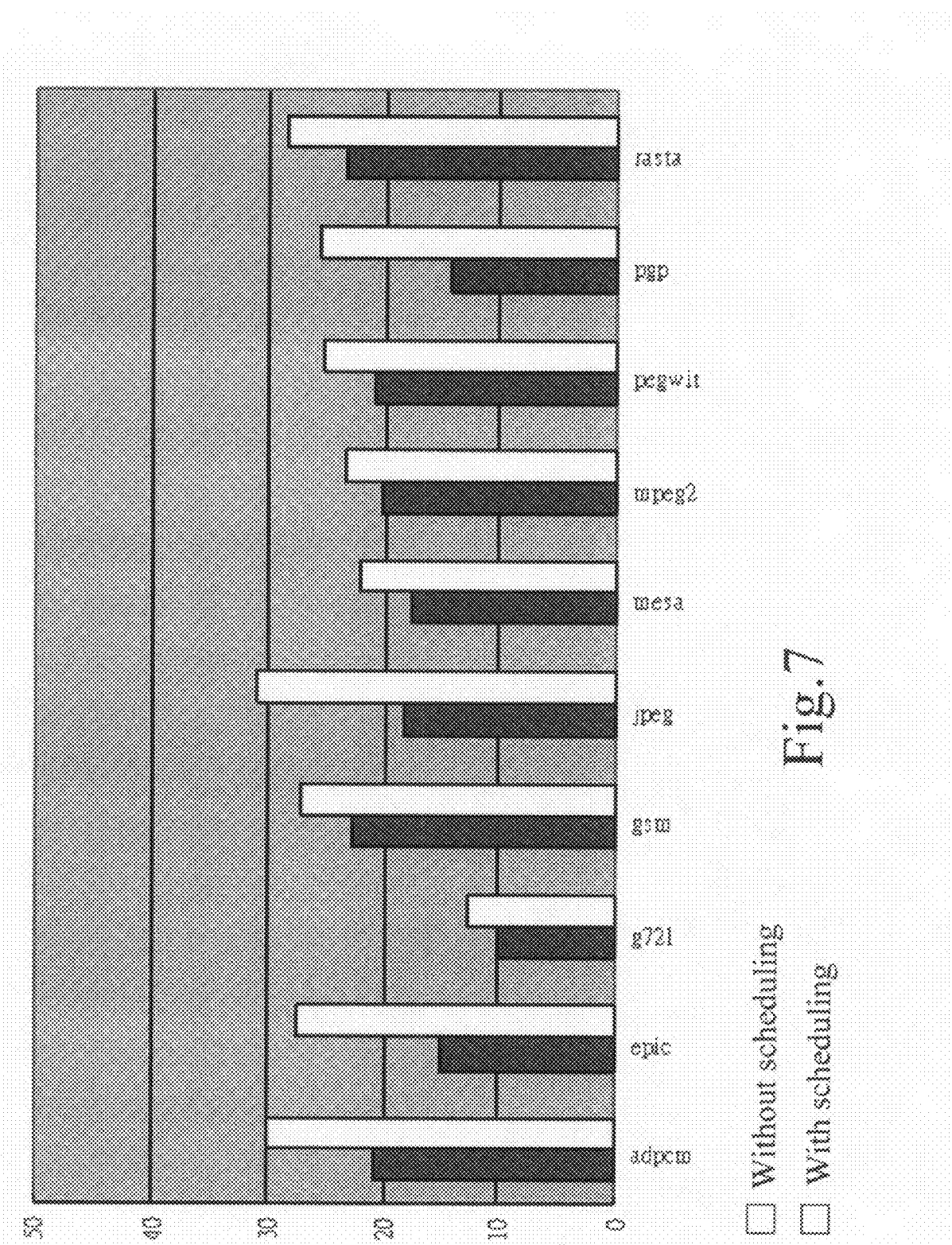
Figure 8:
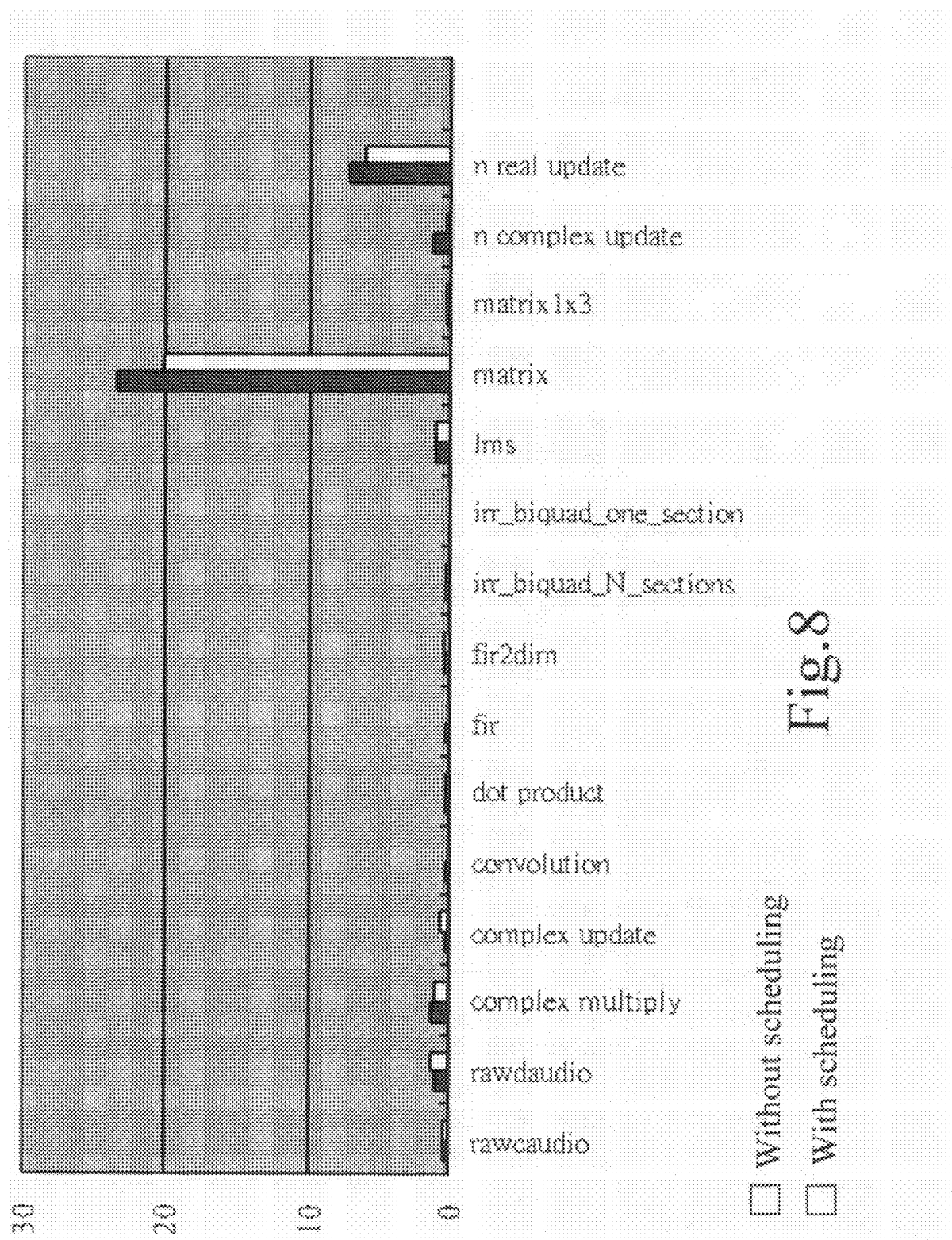
FIG. 8 to FIG. 10 are diagrams showing the performances of executing various instructions when the original program codes and the rescheduled and optimized program codes output by the power-aware compiling method of the present invention are respectively tested with the standard benchmarks, including: the SPEC2000, the Mediabench and the Dspstone.
Figure 9:
Figure 10:
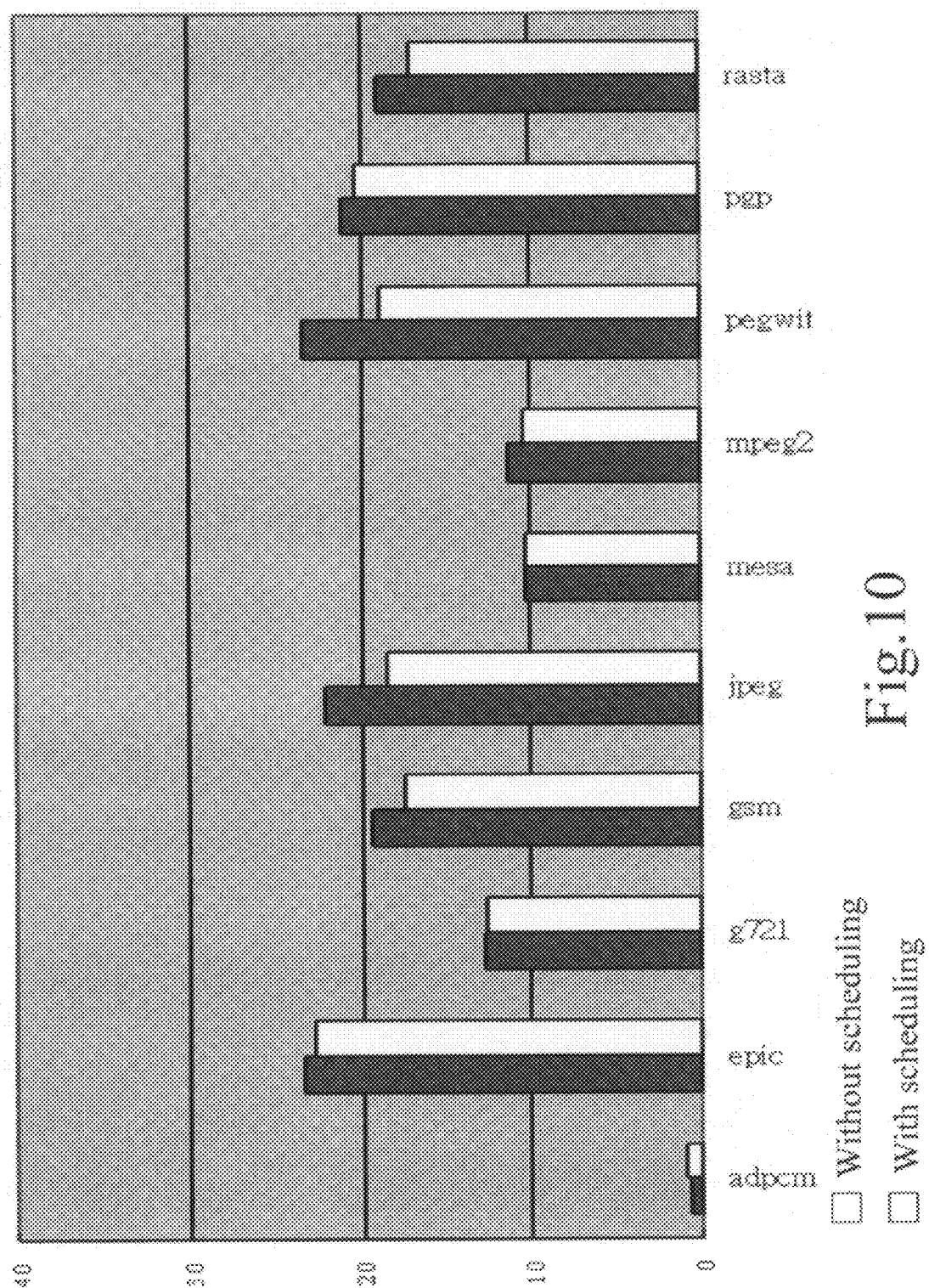

Refer to from FIG. 5 to FIG. 7 diagrams showing the power consumptions in executing various instructions when the original program codes and the rescheduled and optimized program codes output by the power-aware compiling method of the present invention are respectively tested with the standard benchmarks, including: the SPEC2000, the Mediabench and the Dspstone. As shown in FIG. 5, the power consumption by the matrix instruction of the original program codes is more 2 times that of the rescheduled and optimized program codes. In fact, except the irr_biquad_one_section instruction, all the other instructions after the rescheduling and optimization are more power-efficient than those before the rescheduling and optimization. Similarly, in the tests with the Mediabench and the Dspstone, the power-aware efficacy of the present invention can also be obviously observed. Refer to from FIG. 8 to FIG. 10 diagrams showing the performances of executing various instructions when the original program codes and the rescheduled and optimized program codes output by the power-aware compiling method of the present invention are respectively tested with the standard benchmarks, including: the SPEC2000, the Mediabench and the Dspstone. As the change in the lengths of the program codes before and after the rescheduling and optimization by the method of the present invention is small, the change in the performances of them is not obvious.

In summary, the present invention proposes a power-aware compiling method, wherein the switching activities of functional units and the transitions between different power modes are decreased via merging identical but independent idle functional units of different basic blocks into a new basic block, and thereby, the power consumption can be reduced; via the verifications by the SPEC2000, the Mediabench and the Dspstone, it is proved that the present invention can averagely save the power consumption by 26% without obvious performance degradation under the background of the DVS (Dynamic Voltage Scaling) technology.

Those described above are only preferred embodiments to clarify the present invention; however, it is not intended to limit the scope of the present invention. Any equivalent modification and variation according to the spirit of the present invention is to be also included within the scope of the claims of the present invention.

What is claimed is:

1. A power-aware compiling method by a compiler, operating through a CPU and a RAM in a computer, and rescheduling compiled machine codes output in achieving power-aware compiling comprising the following steps:
    establishing a control flow graph and a data flow graph of an application program;
    dividing said control flow graph into a plurality of basic blocks according to the usage of functional units used by said application program;
    analyzing said control flow graph and said data flow graph, establishing a power model of said application program based on the analysis, and assigning each of said functional units with one power mode according to the power model;
    determining whether idle and identical said functional units are independent between the identical and idle functional units; if independent, program codes of said idle and identical functional units are merged into a new basic block; turning off said idle and identical functional units; assigning an appropriate power mode to said new basic block; and
    merging said plurality of basic blocks with identical power modes.

2. The power-aware compiling method by a compiler according to claim 1, wherein said compiler is a SUIF2 compiling system.

3. The power-aware compiling method by a compiler according to claim 1, wherein said control flow graph and said data flow graph are established based on functional-unit analysis and optimization interface provided after compilation of said application program.

4. The power-aware compiling method by a compiler according to claim 1, wherein each of said plurality of basic blocks comprises a plurality of functional units.

5. The power-aware compiling method by a compiler according to claim 1, wherein said plurality of basic blocks is preset to be in a normal mode; after merging, said new basic block is in a low power consumption mode.

6. The power-aware compiling method by a compiler according to claim 1, wherein whether said functional units are dependent is determined according to said data flow graph.

7. The power-aware compiling method by a compiler according to claim 1, wherein whether said new basic block is switched to an appropriate power mode is determined according to said power model.

8. The power-aware compiling method by a compiler according to claim 1, wherein said functional units preset to turned on or turned off before execution.

9. The power-aware compiling method by a compiler according to claim 1, wherein if said functional units are independent, the control flow graph and the data flow graph continue.

10. The power-aware compiling method by a compiler according to claim 1, wherein when said functional units are repeatedly used, said plurality of basic blocks having said functional units is set to be in a low-voltage mode.

* * * * *